United States Patent
Ishi et al.

(10) Patent No.: US 9,884,378 B2
(45) Date of Patent: Feb. 6, 2018

(54) CUTTING INSERT, CUTTING TOOL, AND METHOD OF MANUFACTURING MACHINED PRODUCT

(71) Applicant: KYOCERA Corporation, Kyoto-shi, Kyoto (JP)

(72) Inventors: Hirohisa Ishi, Omihachiman (JP); Yoshihito Ikeda, Ritto (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 15/037,197

(22) PCT Filed: Nov. 17, 2014

(86) PCT No.: PCT/JP2014/080315
§ 371 (c)(1),
(2) Date: May 17, 2016

(87) PCT Pub. No.: WO2015/076216
PCT Pub. Date: May 28, 2015

(65) Prior Publication Data
US 2016/0288224 A1 Oct. 6, 2016

(30) Foreign Application Priority Data

Nov. 19, 2013 (JP) ................................. 2013-239128

(51) Int. Cl.
*B23C 5/20* (2006.01)
*B23C 5/06* (2006.01)

(52) U.S. Cl.
CPC ................ *B23C 5/207* (2013.01); *B23C 5/06* (2013.01); *B23C 5/202* (2013.01);
(Continued)

(58) Field of Classification Search
CPC ..... B23C 5/202; B23C 5/207; B23C 2200/08; B23C 2200/123; B23C 2200/20;
(Continued)

(56) References Cited

U.S. PATENT DOCUMENTS 6,217,263 B1 * 4/2001 Wiman ................ B23B 27/141
407/114
6,413,023 B1 * 7/2002 Nagashima ........... B23C 5/2221
407/113
(Continued)

FOREIGN PATENT DOCUMENTS

CN 102802855 A 11/2012
EP 0962272 A1 12/1999
(Continued)

OTHER PUBLICATIONS

Chinese Office Action with English concise explanation, Chinese Patent Application No. 201480063029.2, dated Feb. 27, 2017, 11 pgs.
(Continued)

*Primary Examiner* — Daniel Howell
*Assistant Examiner* — Yasir Diab
(74) *Attorney, Agent, or Firm* — Volpe and Koenig, P.C.

(57) ABSTRACT

A cutting insert according to an embodiment has a polygonal shaped upper surface, a lower surface, a side surface, and a cutting edge. The cutting edge has an arc-shaped first corner edge, an arc-shaped second corner edge, and a wiper edge located between the first corner edge and the second corner edge. The wiper edge has an arc-shaped first wiper edge and an arc-shaped second wiper edge located closer to the second corner edge than the first wiper edge. R0<R1<R2 is satisfied wherein R1 is a radius of curvature of the first wiper
(Continued)

edge, R2 is a radius of curvature of the second wiper edge, and R0 is a radius of curvature of each of the corner edges in a top view.

10 Claims, 16 Drawing Sheets

(52) U.S. Cl.
CPC .. *B23C 2200/0422* (2013.01); *B23C 2200/08* (2013.01); *B23C 2200/123* (2013.01); *B23C 2200/203* (2013.01); *B23C 2200/205* (2013.01); *B23C 2200/208* (2013.01)

(58) Field of Classification Search
CPC ......... B23C 2200/203; B23C 2200/208; Y10T 409/303808
See application file for complete search history.

(56) References Cited

U.S. PATENT DOCUMENTS

| | | | |
|---|---|---|---|
| 7,402,878 | B2 | 7/2008 | Tarn |
| 8,740,509 | B2* | 6/2014 | Luik ................... B23C 5/109 407/113 |
| 2003/0002929 | A1* | 1/2003 | Nagashima ............ B23C 5/06 407/40 |
| 2007/0031201 | A1 | 2/2007 | Maeda |
| 2007/0297865 | A1 | 12/2007 | Hessman |
| 2009/0097929 | A1* | 4/2009 | Festeau .................. B23C 5/202 407/114 |
| 2012/0087749 | A1* | 4/2012 | Uno ......................... B23C 5/06 407/42 |
| 2012/0093596 | A1 | 4/2012 | Ishi |
| 2012/0155976 | A1* | 6/2012 | Ishi ........................... B23C 5/06 407/33 |
| 2014/0178135 | A1 | 6/2014 | Yamamoto |
| 2014/0193216 | A1 | 7/2014 | Maeta et al. |
| 2014/0334890 | A1 | 11/2014 | Takahashi |

FOREIGN PATENT DOCUMENTS

| | | |
|---|---|---|
| EP | 1752245 A2 | 2/2007 |
| EP | 1872889 A1 | 1/2008 |
| EP | 2727673 A1 | 5/2014 |
| EP | 2792441 A1 | 10/2014 |
| JP | 2000-005903 A | 1/2000 |
| JP | 2001-138122 A | 5/2001 |
| JP | 2001-198724 A | 7/2001 |
| JP | 2004-255521 A | 9/2004 |
| JP | 2007-044782 A | 2/2007 |
| JP | 2008-006579 A | 1/2008 |
| JP | 2008-036795 A | 2/2008 |
| JP | 2013-176834 A | 9/2013 |
| JP | 2014-083626 A | 5/2014 |
| WO | WO 2011009687 A1 * | 1/2011 ............ B23C 5/109 |
| WO | 2013/002341 A1 | 1/2013 |

OTHER PUBLICATIONS

International Search Report, PCT/JP2014/080315, dated Jan. 27, 2015, 2 pgs.
Japanese Office Action with English concise explanation, Japanese Patent Application No. 2015-549135, dated May 16, 2017, 10 pgs.
Extended European Search Report, European Patent Application No. 14864242.4, dated Jun. 26, 2017, 7 pgs.

* cited by examiner

CUTTING INSERT, CUTTING TOOL, AND METHOD OF MANUFACTURING MACHINED PRODUCT

TECHNICAL FIELD

The present invention relates to a cutting insert, a cutting tool, and a method of manufacturing a machined product.

BACKGROUND ART

A milling tool used in a milling process for a workpiece generally includes a plurality of cutting inserts. In order to more evenly finish a processed surface of the workpiece, it has been known that at least one of the cutting inserts (indexable inserts) is configured to have a wiper edge (an indexable insert with the wiper edge) protruding toward the workpiece relative to a flat cutting edge of other cutting insert, as in a milling tool disclosed in Japanese Unexamined Patent Publication No. 2001-138122 (Patent Document 1).

In the milling tool disclosed in Patent Document 1, the wiper edge is an approximately straight line shaped cutting edge or an approximately arc-shaped cutting edge having a large radius of curvature. In this case, during the milling process in which the workpiece is subjected to repetitive cutting by the cutting insert with the wiper edge, there occurs a large overlapping area between a rotation locus of the cutting insert with the wiper edge that precedingly cuts the workpiece, and a rotation locus of the cutting insert with the wiper edge that succeedingly cuts the workpiece. Therefore, a chip cut by the wiper edge may have an excessively small thickness. When the chip has the excessively small thickness, the processed surface of the workpiece may be roughened as being gouged out, and a finished surface state may be conversely deteriorated.

The present invention has been made in view of the above problem, and aims at providing a cutting insert capable of improving the finished surface state by reducing occurrence of gouge phenomenon, as well as a cutting tool, and a method of manufacturing a machined product.

SUMMARY OF THE INVENTION

A cutting insert according to an embodiment of the present invention has a polygonal shaped upper surface, a lower surface, a side surface connected to each of the upper surface and the lower surface, and a cutting edge located along an intersection of the upper surface and the side surface. The cutting edge has an arc-shaped first corner edge and an arc-shaped second corner edge which are respectively located at corner portions adjacent to each other on the upper surface, and a wiper edge located between the first corner edge and the second corner edge.

The wiper edge has an arc-shaped first wiper edge and an arc-shaped second wiper edge located closer to the second corner edge than the first wiper edge. R0<R1<R2 is satisfied wherein R1 is a radius of curvature of the first wiper edge, R2 is a radius of curvature of the second wiper edge, and R0 is a radius of curvature of each of the first corner edge and the second corner edge in a top view.

EMBODIMENTS FOR CARRYING OUT THE INVENTION

<Cutting Insert>

Figure 1:
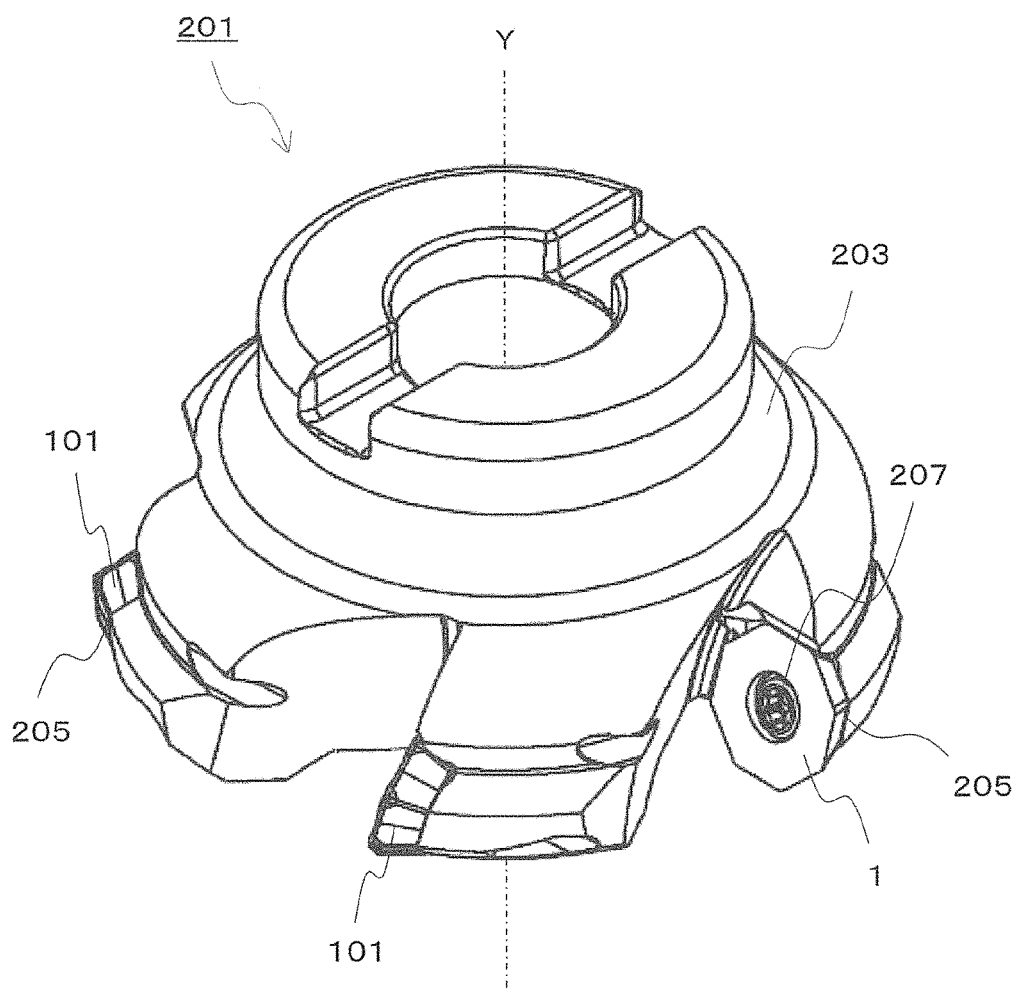
FIG. 1 is a perspective view showing a cutting tool of a first embodiment of the present invention.
Figure 2:
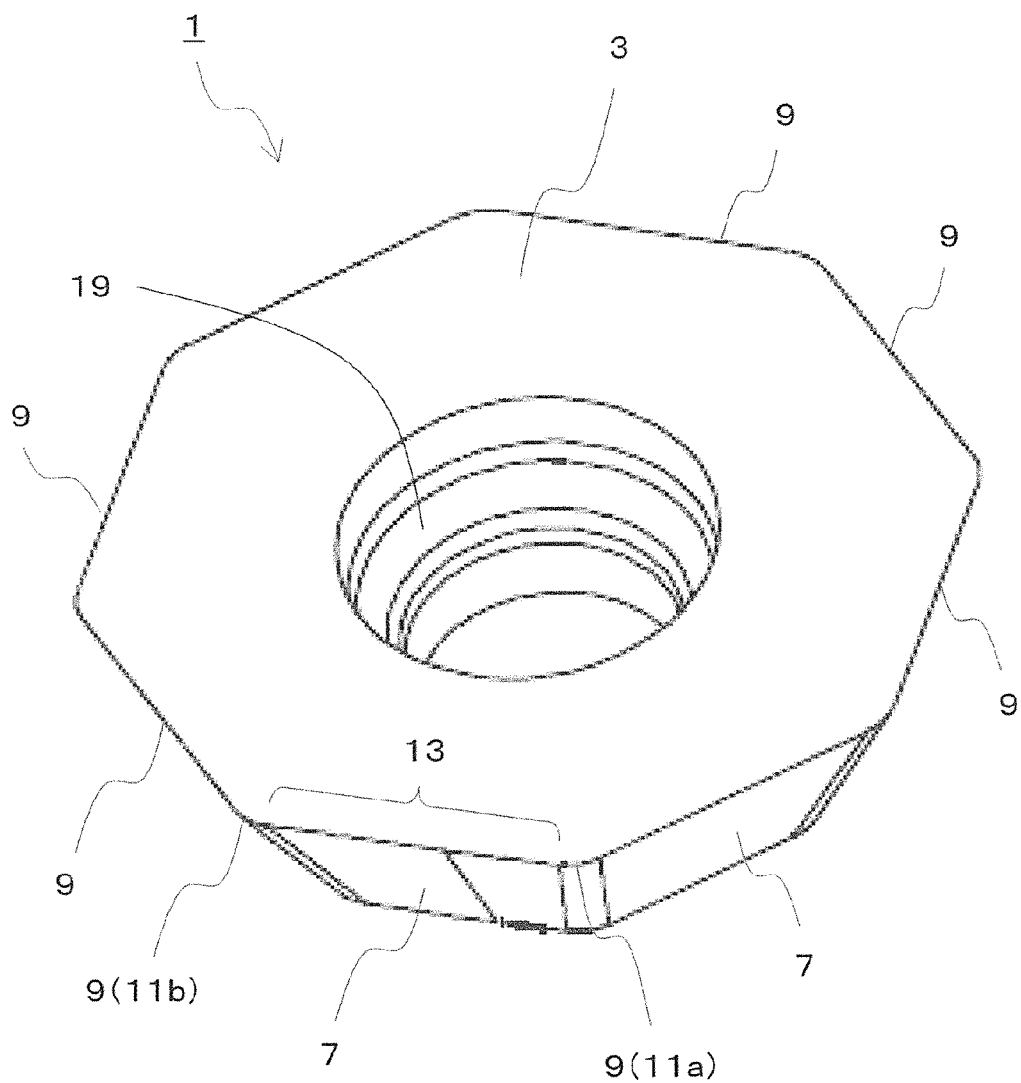
FIG. 2 is a perspective view showing a cutting insert of the first embodiment of the present invention.
Figure 3:
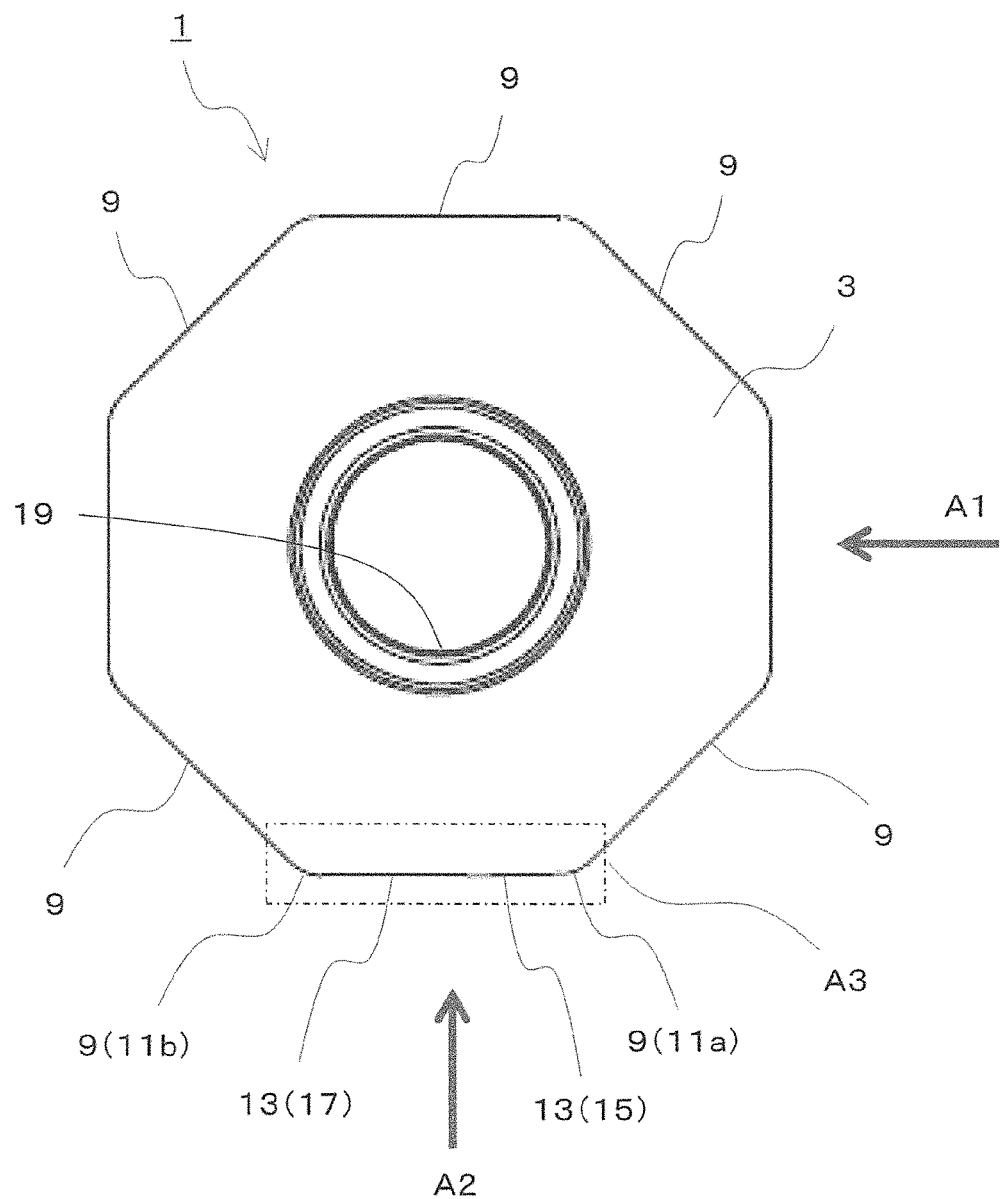
FIG. 3 is a top view of the cutting insert shown in FIG. 2.
Figure 4:
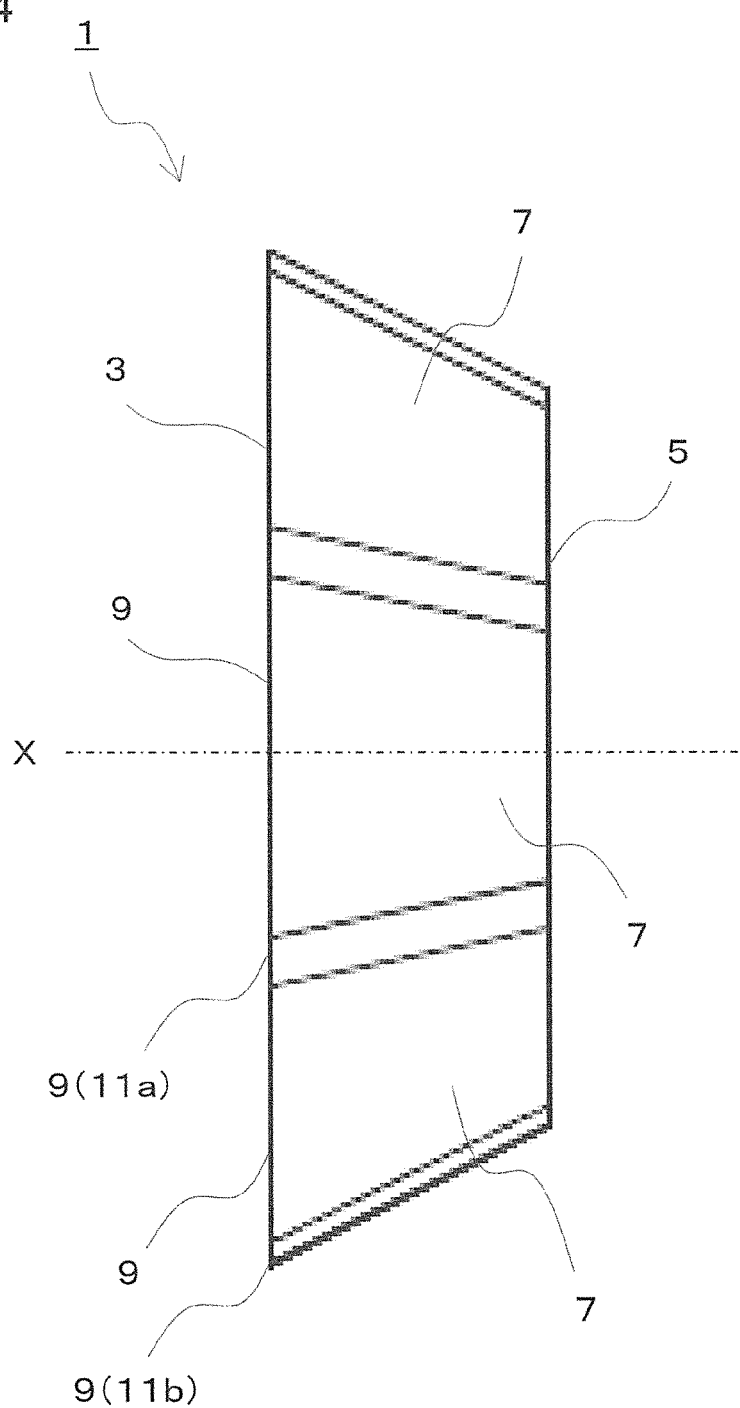
FIG. 4 is a side view from an arrowed direction A1 in the cutting insert shown in FIG. 3.
Figure 5:
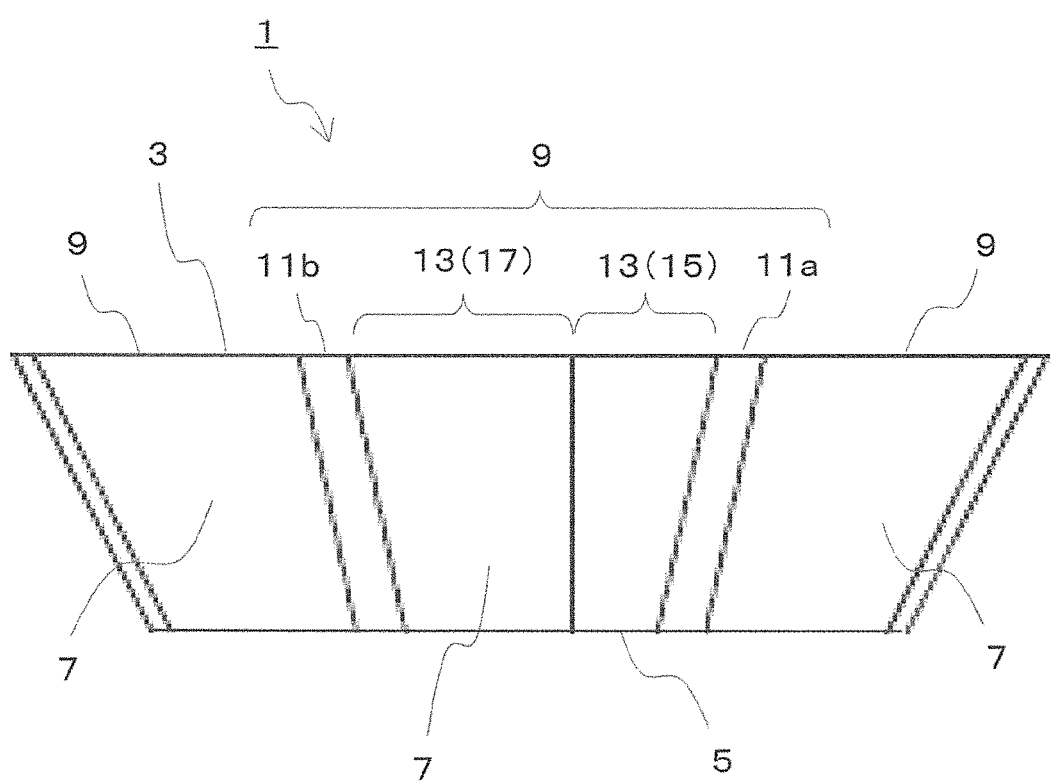
FIG. 5 is a side view from an arrowed direction A2 in the cutting insert shown in FIG. 3.

A cutting insert of an embodiment is described in detail below with reference to the drawings. For the sake of convenience, the drawings referred to in the following show, in simplified form, only major components among components of the embodiment which are necessary for describing the present invention. Therefore, the cutting insert of the present invention may include any optional component not shown in the drawings referred to in the present description. Sizes of the components in the drawings are not faithful to sizes of actual components and to size ratios of the actual components.

The cutting insert 1 with a wiper edge according to the present embodiment (hereinafter also referred to as the first insert 1 for the sake of convenience) is, as exemplified by FIG. 1, a cutting insert attachably and detachably secured to an insert pocket 205 located close to a front end side of a tool body 203 described later. The cutting tool 201 for use in a milling process as exemplified by FIG. 1 is made up of the tool body 203, and the first insert 1 with the wiper edge and a cutting insert 101 without the wiper edge (hereinafter also referred to as the second insert 101 for the sake of convenience), both of which are respectively attached to the tool body 203.

As shown in FIGS. 2 to 6, the first insert 1 of the present embodiment has an approximately polygonal upper surface 3, a lower surface 5, a side surface 7 connected to each of the upper surface 3 and the lower surface 5, and a cutting edge 9 located along an intersection of the upper surface 3 and the side surface 7. The upper surface 3 functions as a rake surface along which chips flow during a cutting process.

The upper surface 3 has the approximately polygonal shape, specifically an approximately octagonal shape in the present embodiment. The term "approximately polygonal shape" does not denote a strict polygonal shape. For example, each of corner portions on the upper surface 3 in the present embodiment does not form a strict corner but has a round shape. Each of side parts on the upper surface 3 does not strictly form a straight line shape but has a slightly curvilinear shape as described later.

The lower surface 5 is a surface located on the opposite side of the upper surface 3, and functions as a seating surface with respect to the insert pocket when the first insert 1 is attached to the tool body. Similarly to the upper surface 3, the lower surface 5 in the present embodiment has an approximately polygonal shape, specifically an approximately octagonal shape. The lower surface 5 is made slightly smaller than the upper surface 3. Therefore, the lower surface 5 is made similar in shape to the upper surface 3.

The cutting edge 9 in the present embodiment has a first corner edge 11a, a second corner cutting edge 11b, and at least one wiper edge 13. The first corner edge 11a and the second corner edge 11b are respectively located at the corner portions adjacent to each other on the upper surface 3. The corner portions of the upper surface 3 have the round shape as described above, and therefore, each of the first corner edge 11a and the second corner edge 11b has an arc shape in a top view.

Figure 6:
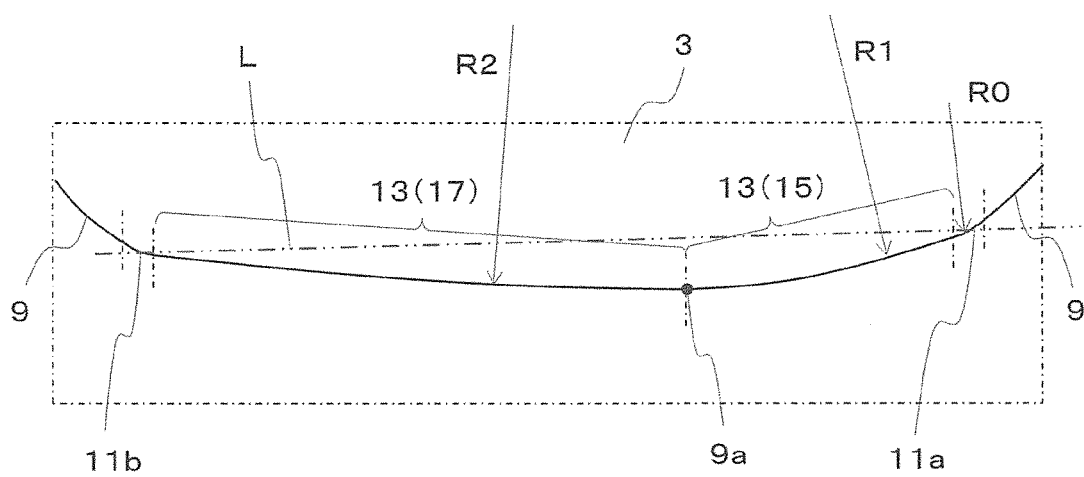
FIG. 6 is an enlarged view showing in enlarged dimension a region A3 in the cutting insert shown in FIG. 3.

In the first insert 1 shown in FIG. 6, the first corner edge 11a is located closer to an outer peripheral side of the tool body than the second corner edge 11b when the first insert 1 is attached to the tool body. In other words, the second corner edge 11b is located closer to an inner peripheral side of the tool body than the first corner edge 11a when the first insert 1 is attached to the tool body.

That is, a right side in FIG. 6 corresponds to the outer peripheral side of the tool body, and a left side in FIG. 6 corresponds to the inner peripheral side of the tool body. A lower side in FIG. 6 corresponds to a direction from the tool body toward a front end, in other words, a protruding direction toward a workpiece.

The wiper edge 13 is located between the first corner edge 11a and the second corner edge 11b adjacent to each other, namely, on the side part of the upper surface 3. The wiper edge 13 functions as a cutting edge that smoothly finishes a processed surface of the workpiece. Therefore, when the first insert 1 is attached to the tool body, the wiper edge 13 is disposed so as to include a front end portion 9a of the cutting edge 9 which protrudes most in the direction from the tool body toward the front end, in other words, toward the workpiece. In the present embodiment, the front end portion 9a is located at a portion most away from a virtual straight line L connecting a center of the first corner edge 11a and a center of the second corner edge 11b when the wiper edge 13 is viewed from above.

The wiper edge 13 in the present embodiment has a first wiper edge 15 and a second wiper edge 17. The first wiper edge 15 is located closer to the first corner edge 11a than the second wiper edge 17. Therefore, the first wiper edge 15 is located closer to the outer peripheral side of the tool body than the second wiper edge 17 when the first insert 1 is attached to the tool body. In the present embodiment, the first wiper edge 15 is disposed so that at least a part thereof is located closer to the outer peripheral side of the tool body than the front end portion 9a.

The second wiper edge 17 is located closer to the second corner edge 11b than the first wiper edge 15. Therefore, the second wiper edge 17 is disposed so as to be located closer to the inner peripheral side of the tool body than the first wiper edge 15. In other words, the second wiper edge 17 is disposed so as to be located closer to a rotation central axis of the tool body than the first wiper edge 15. In the present embodiment, the second wiper edge is disposed so that at least a part thereof is located closer to the inner peripheral side of the tool body than the front end portion 9a when the first insert 1 is attached to the tool body.

In the first insert 1 of the present embodiment, the first wiper edge 15 and the second wiper edge 17 are continuous with each other. When the wiper edge 13 is viewed from above, a boundary between the first wiper edge 15 and the second wiper edge 17 is located at the portion most away from the virtual straight line L connecting the center of the first corner edge 11a and the center of the second corner edge 11b. In other words, the front end portion 9a is located at the boundary between the first wiper edge 15 and the second wiper edge 17. Therefore, the first wiper edge 15 is disposed so that the entirety thereof is located closer to the outer peripheral side of the tool body than the front end portion 9a. The second wiper edge 17 is disposed so that the entirety thereof is located closer to the inner peripheral side of the tool body than the front end portion 9a.

In the first insert 1 shown in FIG. 6, the front end portion 9a in the cutting edge 9 is located lowermost in the cutting edge 9. The first wiper edge 15 is disposed so as to be located close to the outer peripheral side of the tool body in the wiper edge 13 surrounded by the first corner edge 11a and the second corner edge 11b, namely, on the right side in FIG. 6. The first wiper edge 15 is continuous with the first corner edge 11a. The second wiper edge 17 is disposed so as to be located close to the inner peripheral side of the tool body in the wiper edge 13 surrounded by the first corner edge 11a and the second corner edge 11b, namely, on the left side in FIG. 6. The second wiper edge 17 is continuous with the second corner edge 11b.

The first wiper edge 15 and the second wiper edge 17 are respectively formed so as to have an arc shape in a top view. Here, a radius of curvature of each of the first corner edge 11a and the second corner edge 11b is taken as $R0$, a radius of curvature of the first wiper edge 15 is taken as $R1$, and a radius of curvature of the second wiper edge 17 is taken as $R2$. The first insert 1 of the present embodiment satisfies $R0<R1<R2$.

In the first insert 1 of the present embodiment, the wiper edge 13 having a large radius of curvature is located between the first corner edge 11a and the second corner edge 11b each having a small radius of curvature. The wiper edge 13 also has the curvilinear shape not a straight line shape. Further, the wiper edge 13 does not have a simple arc shape made of a single arc, but is made up of the first wiper edge 15 that is located close to the outer peripheral side during the cutting process and has a relatively small radius of curvature, and the second wiper edge 17 that is located close to the inner peripheral side during the cutting process and has a relatively large radius of curvature.

Figure 7A:
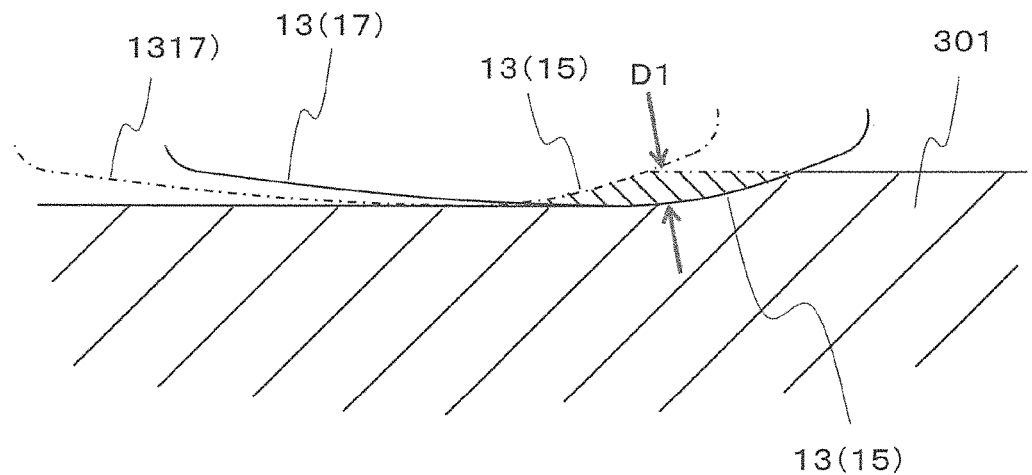
FIG. 7(a) is a conceptual diagram when a cutting process is carried out using the cutting insert shown in FIG. 2.
Figure 7B:
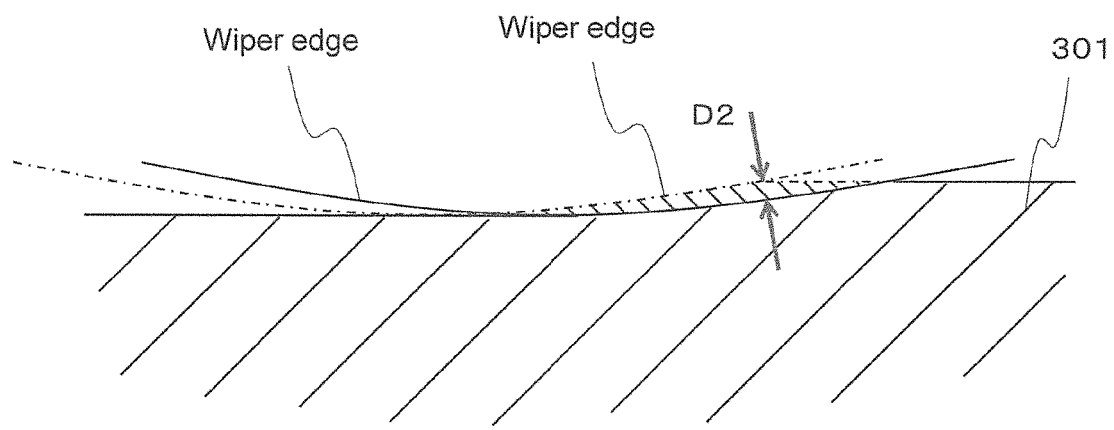
FIG. 7(b) is a conceptual diagram when the cutting process is carried out using a conventional cutting insert.

When the wiper edge has an approximately arch shape made of an arc having a large radius of curvature, a thickness $D2$ of a chip is extremely small as shown in FIG. 7(b). In each of FIGS. 7(a) and 7(b), a locus of the wiper edge that precedingly cuts the workpiece 301 is indicated by a long dashed short dashed line, and a locus of the wiper edge that succeedingly cuts the workpiece 301 is indicated by a solid line. Therefore, a region indicated by a group of diagonal lines extending from upper left toward lower right in FIG. 7 is to become chips cut by the wiper edges.

As apparent from FIG. 7(*a*), a radius of curvature of the first wiper edge 15 is relatively small in the first insert 1 of the present embodiment. Accordingly, a cutting edge angle formed by the entirety of the first wiper edge 15 is increased, thereby reducing excessive cutting of the workpiece 301 by the wiper edge 13 that precedingly cuts the workpiece 301, which is indicated by the long dashed short dashed line. This ensures a thickness D1 of a chip cut by the second wiper edge 17 when the cutting process is carried out using the cutting insert 1 with the wiper edges, which is indicated by the solid line.

The thicknesses of the chips are so ensured, thereby reducing the phenomenon that the processed surface is gouged. A satisfactory gloss of the processed surface is also attainable by reducing the occurrence of the phenomenon as described above. Furthermore, surface roughness of the processed surface is stably reducible because the radius of curvature of the second wiper edge 17 is relatively large. The above-mentioned cutting edge angle formed by the entirety of the first wiper edge 15 denotes an angle formed by a virtual straight line connecting one end portion and the other end portion of the first wiper edge 15 with respect to the processed surface of the workpiece.

The radius of curvature R0 of each of the first corner edge 11*a* and the second corner edge 11*b* in the present embodiment is set to approximately 0.4-2 mm. The radius of curvature R1 of the first wiper edge 15 is set to approximately 50-200 mm. The radius of curvature R2 of the second wiper edge 17 is set to approximately 200-800 mm.

The wiper edge 13 located on the side part on the upper surface 3 is made up of the arc-shaped first wiper edge 15 and the arc-shaped second wiper edge 17. Therefore, the side part on the upper surface 3 has a slightly curvilinear shape.

In the present embodiment, the second wiper edge 17 is made longer than the first wiper edge 15. This makes it possible to ensure a length of the second wiper edge 17 while ensuring the large cutting edge angle of the first wiper edge 15. This ensures a large length of the second wiper edge 17 whose cutting edge angle is relatively small, thereby enhancing flatness of the processed surface.

The intersection of the upper surface 3 and the side surface 7 may not be a strict line shape formed by intersection of two surfaces. A sharp intersection of the upper surface 3 and the side surface 7 may deteriorate durability of the cutting edge 9. Hence, an intersecting portion of the upper surface 3 and the side surface 7 may have a slightly curvilinear shape, that is, may be subjected to a so-called honing process.

For example, cemented carbide or cermet is usable as a material of the first insert 1. Examples of compositions of the cemented carbide include WC-Co produced by adding cobalt (Co) powder to tungsten carbide (WC), followed by sintering, WC-TiC-Co produced by adding titanium carbide (TiC) to WC-Co, and WC-TiC-TaC-Co produced by adding tantalum carbide (TaC) to WC-TiC-Co. The cermet is a sintered composite material obtained by compositing metal with a ceramic ingredient, and is specifically a titanium compound composed mainly of titanium carbide (TiC) or titanium nitride (TiN).

A surface of the first insert 1 may be coated with a film by chemical vapor deposition (CVD) method or physical vapor deposition (PVD) method. Examples of compositions of the film include titanium carbide (TiC), titanium nitride (TiN), titanium carbonitride (TiCN), and alumina ($Al_2O_3$).

The shapes of the upper surface 3 and the lower surface 5 are not limited to the forgoing ones. In the first insert 1 of the present embodiment, the shape of the upper surface 3 is the approximately octagonal shape in the top view. For example, the shape of the upper surface 3 may be a polygonal shape, such as a triangular shape, a square shape, a pentagonal shape, and a hexagonal shape in the top view.

A through hole 19 extends between the center of the upper surface 3 and the center of the lower surface 5. The through hole 19 is disposed for inserting a screw when the first insert 1 is screwed into the tool body of the cutting tool. A direction of a central axis X, in other words, a penetrating direction of the through hole 19 is orthogonal to the upper surface 3 and the lower surface 5.

The upper surface 3 in the first insert 1 of the present embodiment has a maximum width of 20-30 mm in the top view. A height from the lower surface 5 to the upper surface 3 is 3-7 mm. The height from the lower surface 5 to the upper surface 3 denotes a width in a direction parallel to the through hole 19 extending between an upper end of the upper surface 3 and a lower end of the lower surface 5.

<Cutting Tool>

A cutting tool 201 according to an embodiment of the present invention is described below with reference to the drawings.

Figure 12:
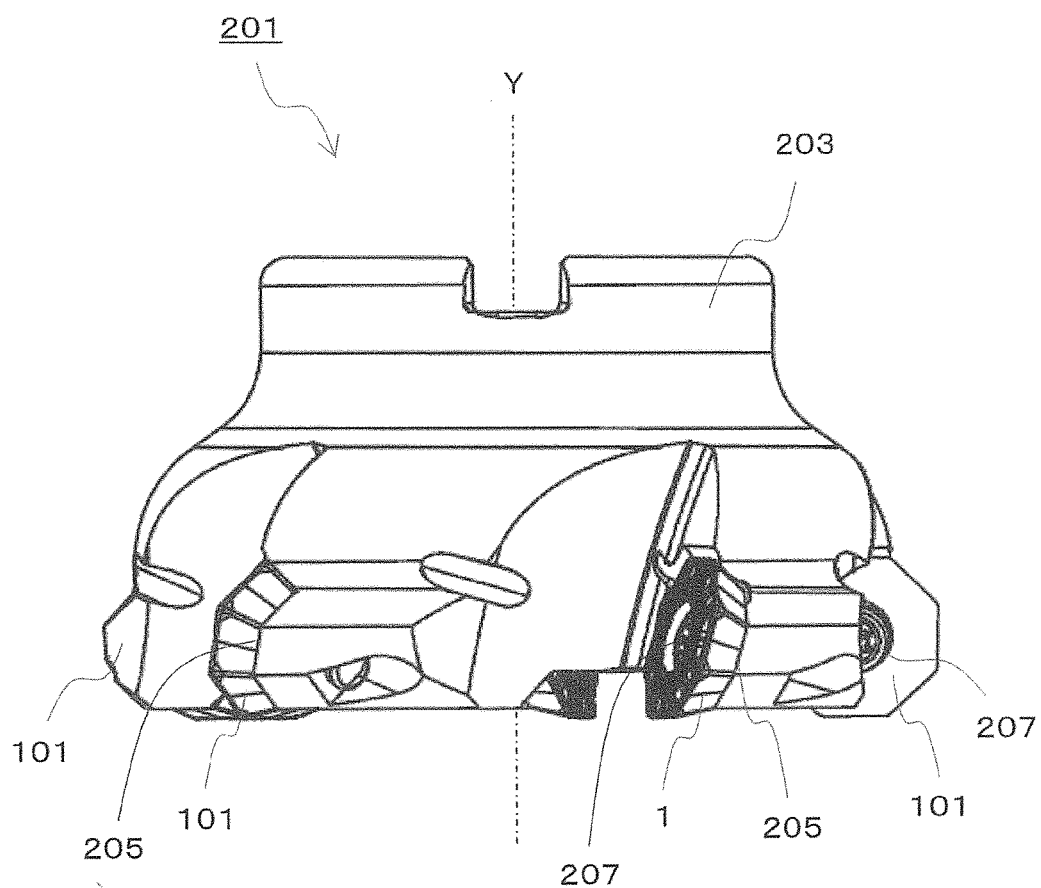
FIG. 12 is a side view of a cutting tool shown in FIG. 1.
Figure 13:
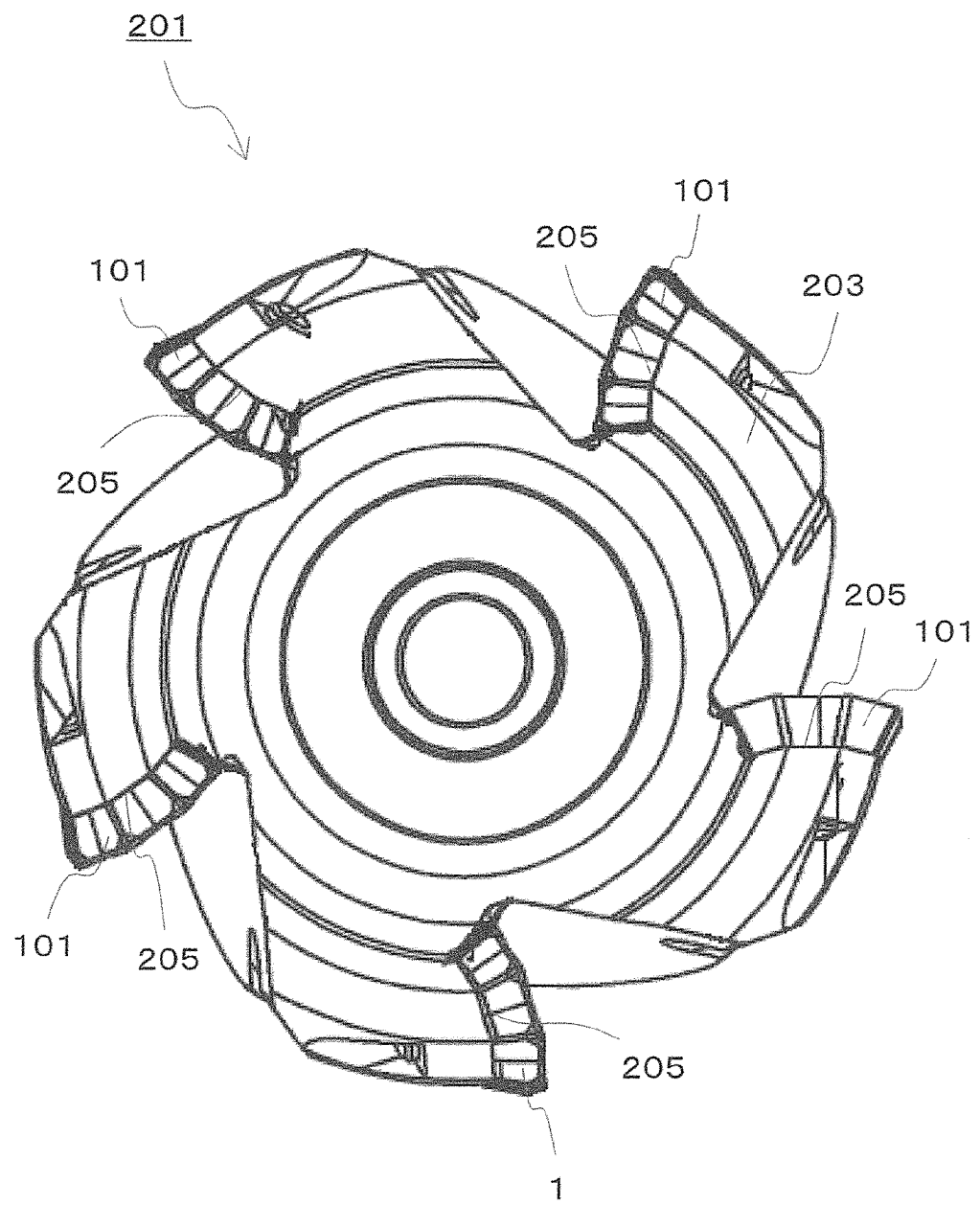
FIG. 13 is a bottom view of the cutting tool shown in FIG. 1.

As shown in FIGS. 1, 12, and 13, the cutting tool 201 of the present embodiment has a tool body 203 (hereinafter also referred to as the holder 203) having a rotation central axis Y and a plurality of insert pockets 205 on an outer peripheral surface close to a front end side thereof, the first insert 1 to be attached to at least one of the insert pockets 205, and the second insert 101 attached to the insert pocket 205 with no first insert 1 attached thereto.

The second insert 101 is configured similarly to the first insert 1 except for the absence of the wiper edge 13 in the first insert 1. Specifically, similarly to the first insert 1, the second insert 101 has an upper surface and a lower surface each having an approximately polygonal shape, and a side surface between the upper surface and the lower surface. A cutting edge is disposed along an intersection of the upper surface and the side surface in the second insert 101. The cutting edge in the second insert 101 has no wiper edge.

A portion of the second insert 101, which corresponds to the wiper edge 13 connecting the first corner edge 11*a* and the second corner edge 11*b* of the first insert 1, has a straight line shape. Therefore, when the first insert 1 and the second insert 101 are attached to the holder 203, the above-mentioned cutting edge portion of the second insert 101 is located closer to a rear end side of the holder 203 than the wiper edge 13 of the first insert 1. Thus, the wiper edge 13 in the first insert 1 further protrudes toward the front end than the cutting edge in the second insert 101, making it possible to satisfactorily finish a processed surface of a workpiece by the wiper edge 13.

The first insert 1 with the wiper edge 13 is subjected to a larger load than the second insert 101 without the wiper edge. Therefore, only a plurality of the first inserts 1 may be attached to the holder 203. In general, however, the second insert 101 is also attached to the holder 203 in addition to the first insert 1. When the first insert 1 with the wiper edge 13 and the second insert 101 without the wiper edge are attached to the holder 203, a larger number of the second inserts 101 than the first insert 1 are usually attached to the holder 203.

The holder 203 is in the shape of an approximately rotary body around the rotation central axis Y. The insert pockets 205 are disposed at equal intervals along an outer peripheral surface on the front end side of the holder 203. The insert pockets 205 are portions to which the first insert 1 or the second insert 101 are to be attached, and open into the outer peripheral surface and the front end surface of the holder 203. Specifically, each of the insert pockets 205 has a seating surface against a rotation direction, and two restricting side surfaces located in a direction that intersects the seating surface.

Then, the first insert 1 or the second insert 101 is attached to the insert pockets 205 disposed on the holder 203. The first insert 1 is attached to the holder 203 so that at least the wiper edge 13 in the cutting edge 9 protrudes in a front end direction beyond the holder 203. On this occasion, the front end portion 9a in the wiper edge 13 is located so as to protrude most in the front end direction beyond the holder 203. In the present embodiment, the first insert 1 is attached to the insert pocket 205 so that the wiper edge 13 in the cutting edge 9 protrudes most in the front end direction beyond the holder 203. This ensures a chip thickness, thereby reducing the occurrence of the phenomenon that the processed surface is gouged.

The second insert 101 is attached to the holder 203 so that the cutting edge disposed along the periphery of the upper surface protrudes in the front end direction beyond the holder 203. On this occasion, the wiper edge 13 in the first insert 1 protrudes more in the front end direction than the cutting edge in the second insert 101 as described above.

In the first insert 1 of the foregoing embodiment, the wiper edge 13 has neither the straight line shape nor the simple arch shape made of the arc, but has the first wiper edge 15 and the second wiper edge 17. When a cutting process is carried out a plurality of times by using the wiper edge 13, it is possible to prevent a workpiece from being excessively cut during the preceding cutting process because the radius of curvature of the first wiper edge 15 is relatively small. This ensures a large chip thickness when the cutting process is carried out using the second wiper edge 17 during the succeeding cutting process.

In the present embodiment, the first insert 1 and the second insert 101 are respectively attached via screws 207 to the insert pockets 205. That is, the first insert 1 and the second insert 101 are respectively fixed to the holder 203 by inserting the screws 207 into the through holes 19 of the first insert 1 and the second insert 101, and then inserting front ends of these screws 207 into screw holes (not shown) formed in the insert pockets 205, and thereafter engaging screw parts with each other.

For example, steel and cast iron are usable as the holder 203. High-rigidity steel is used among these materials in the present embodiment.

<Modification 1>

Figure 8:
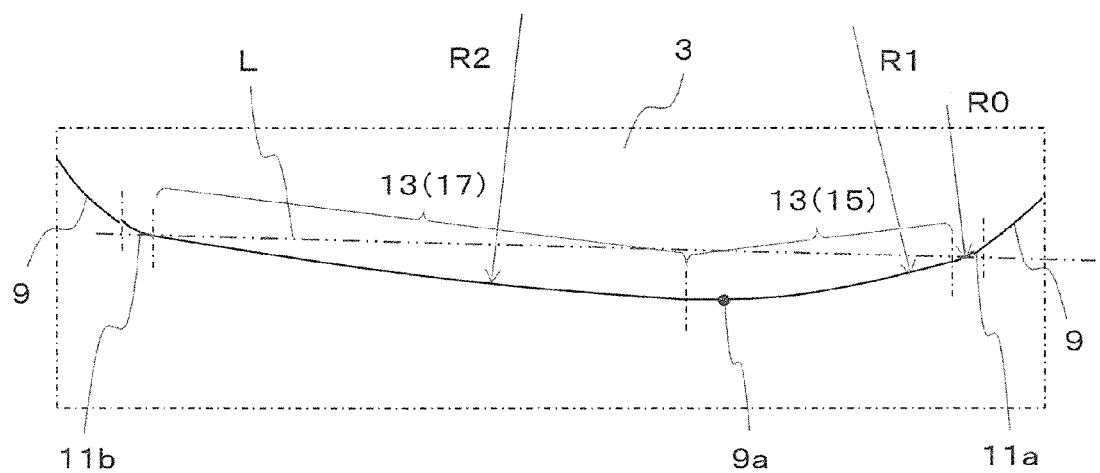
FIG. 8 is a partially enlarged plan view of Modification 1 of the cutting insert shown in FIG. 3.

Modification 1 of the first insert 1 of the foregoing embodiment is described below with reference to FIG. 8. FIG. 8 is a top view showing in enlarged dimension a part of Modification 1, namely, a part corresponding to the region shown in FIG. 6 in the first insert 1 shown in FIG. 3.

Although the front end portion 9a is located at the boundary between the first wiper edge 15 and the second wiper edge 17 in the first insert 1 of the foregoing embodiment, the locations of the first wiper edge 15 and the second wiper edge 17 are not limited to the above embodiment. At least a part of the first wiper edge 15 needs to be located closer to the outer peripheral side of the tool body than the front end portion 9a. Therefore, as shown in FIG. 8, the front end portion 9a may be included in the first wiper edge 15.

Although the second wiper edge 17 is disposed so that the entirety thereof is located closer to the inner peripheral side of the tool body than the front end portion 9a in the first insert 1 of the foregoing embodiment, the first end portion 9a may be included in the second wiper edge 17 instead of the configuration of the foregoing Modification 1.

<Modification 2>

Figure 9:
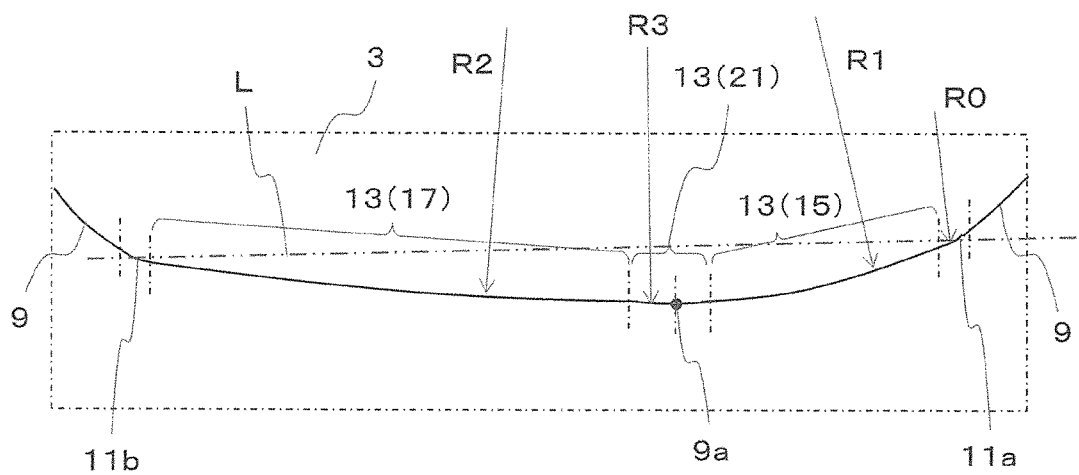
FIG. 9 is a partially enlarged plan view of Modification 2 of the cutting insert shown in FIG. 3.

Modification 2 of the first insert 1 of the foregoing embodiment is described below with reference to FIG. 9. FIG. 9 is a top view showing in enlarged dimension a part of Modification 2, namely, a part corresponding to the region shown in FIG. 6 in the first insert 1 shown in FIG. 3.

Although the wiper edge 13 is made up of the first wiper edge 15 and the second wiper edge 17 in the first insert 1 of the foregoing embodiment, the configuration of the wiper edge 13 is not limited to this embodiment.

In the first insert 1 of the present modification, the wiper edge 13 further has an arch-shaped third wiper edge 21 located between the first wiper edge 15 and the second wiper edge 17. Here, R1<R3 is satisfied in a top view, wherein R3 is a radius of curvature of the third wiper edge 21. The present modification satisfies R1<R3<R2. The radius of curvature R3 of the third wiper edge 21 is set to approximately 200-800 mm.

Although the present modification satisfies R1<R3<R2, no particular limitation is imposed thereon. For example, the present modification may satisfy R1<R2<R3.

When the wiper edge 13 has the third wiper edge 21, it is easy to increase the cutting edge angle of the first wiper edge 15. This makes it easier to ensure a still larger thickness of a chip cut by the second wiper edge 17. It is consequently possible to obtain a more satisfactory state of a finished surface owing to the third wiper edge 21. In order to decrease a cutting edge angle of the second wiper edge 17 while increasing the cutting edge angle of the first wiper edge 15, the third wiper edge 21 is located so as to include the front end portion 9a in the present modification.

In other words, in order to decrease the cutting edge angle of the second wiper edge 17 while increasing the cutting edge angle of the first wiper edge 15, the third wiper edge 21 is located so as to include the portion most away from the virtual straight line L connecting the center of the first corner edge 11a and the center of the second corner edge 11b when the wiper edge 13 is viewed from above in the present modification.

In the present modification, the third wiper edge 21 has a smaller length than each of the first wiper edge 15 and the second wiper edge 17. It is therefore possible to ensure the length of each of the first wiper edge 15 and the second wiper edge 17 without excessively increasing the length of the entirety of the wiper edge 13.

<Modification 3>

Figure 10:
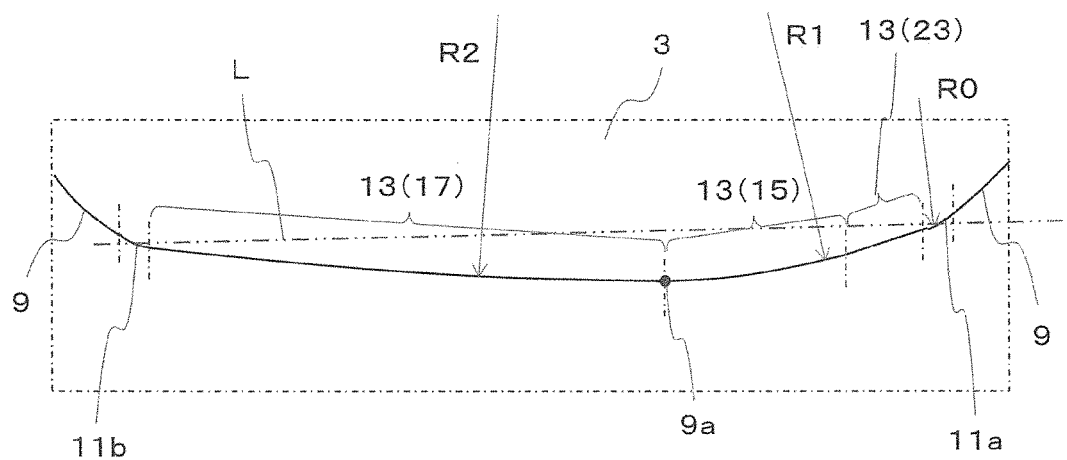
FIG. 10 is a partially enlarged plan view of Modification 3 of the cutting insert shown in FIG. 3.

Modification 3 of the first insert 1 of the foregoing embodiment is described below with reference to FIG. 10. FIG. 10 is a top view showing in enlarged dimension a part of Modification 3, namely, a part corresponding to the region shown in FIG. 6 in the first insert 1 shown in FIG. 3.

Although the wiper edge 13 is made up of the arc-shaped first wiper edge 15 and the arc-shaped second wiper edge 17 in the first insert 1 of the foregoing embodiment, the configuration of the wiper edge 13 is not limited to this embodiment.

In the first insert 1 of the present modification, the wiper edge 13 further has a first straight line edge 23 having a straight line shape which connects the first corner edge 11a and the first wiper edge 15. When the wiper edge 13 is so configured, it is possible to decrease a length of a portion of the wiper edge 13 which is made up of the first wiper edge 15 and the first straight line edge 23 and is located closer to the outer peripheral side of the tool body than the front end portion 9a.

<Modification 4>

Figure 11:
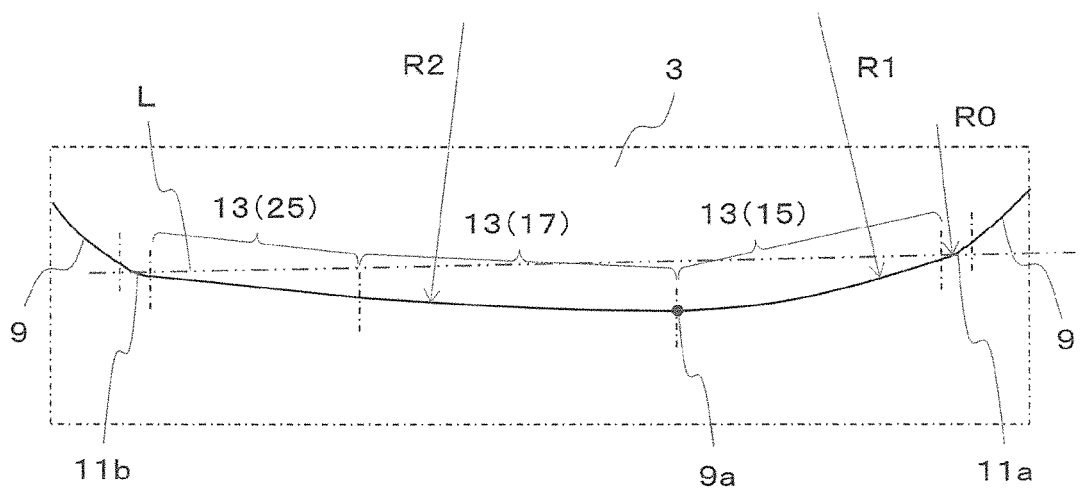
FIG. 11 is a partially enlarged plan view of Modification 4 of the cutting insert shown in FIG. 3.

Modification 4 of the first insert 1 of the foregoing embodiment is described below with reference to FIG. 11. FIG. 11 is a top view showing in enlarged dimension a part of Modification 4, namely, a part corresponding to the region shown in FIG. 6 in the first insert 1 shown in FIG. 3.

Although the wiper edge 13 further has the first straight line edge 23 having the straight line shape which connects the first corner edge 11a and the first wiper edge 15 in the foregoing Modification 3, the wiper edge 13 has a second straight line edge 25 that connects the second corner edge 11b and the second wiper edge 17 in the first insert 1 of the present modification.

When the wiper edge 13 is so configured, it is possible to decrease a cutting edge angle of the entirety of a portion of the wiper edge 13 which is made up of the second wiper edge 17 and the second straight line edge 25 and is located closer to the inner peripheral side of the tool body than the front end portion 9a. It is therefore possible to reduce surface roughness of a finished surface of a workpiece.

<Method of Manufacturing Machined Product>

A method of manufacturing a machined product according to an embodiment of the present invention is described below with reference to the drawings.

The machined product is to be manufactured by subjecting a workpiece 301 to a cutting process. The manufacturing method of the present embodiment includes the following steps:

(1) rotating the cutting tool 201 represented by the foregoing embodiment;

(2) bringing the cutting edge 9 in the cutting tool 201 being rotated into contact with the workpiece 301; and (3) separating the cutting tool 201 from the workpiece 301.

Figure 14:
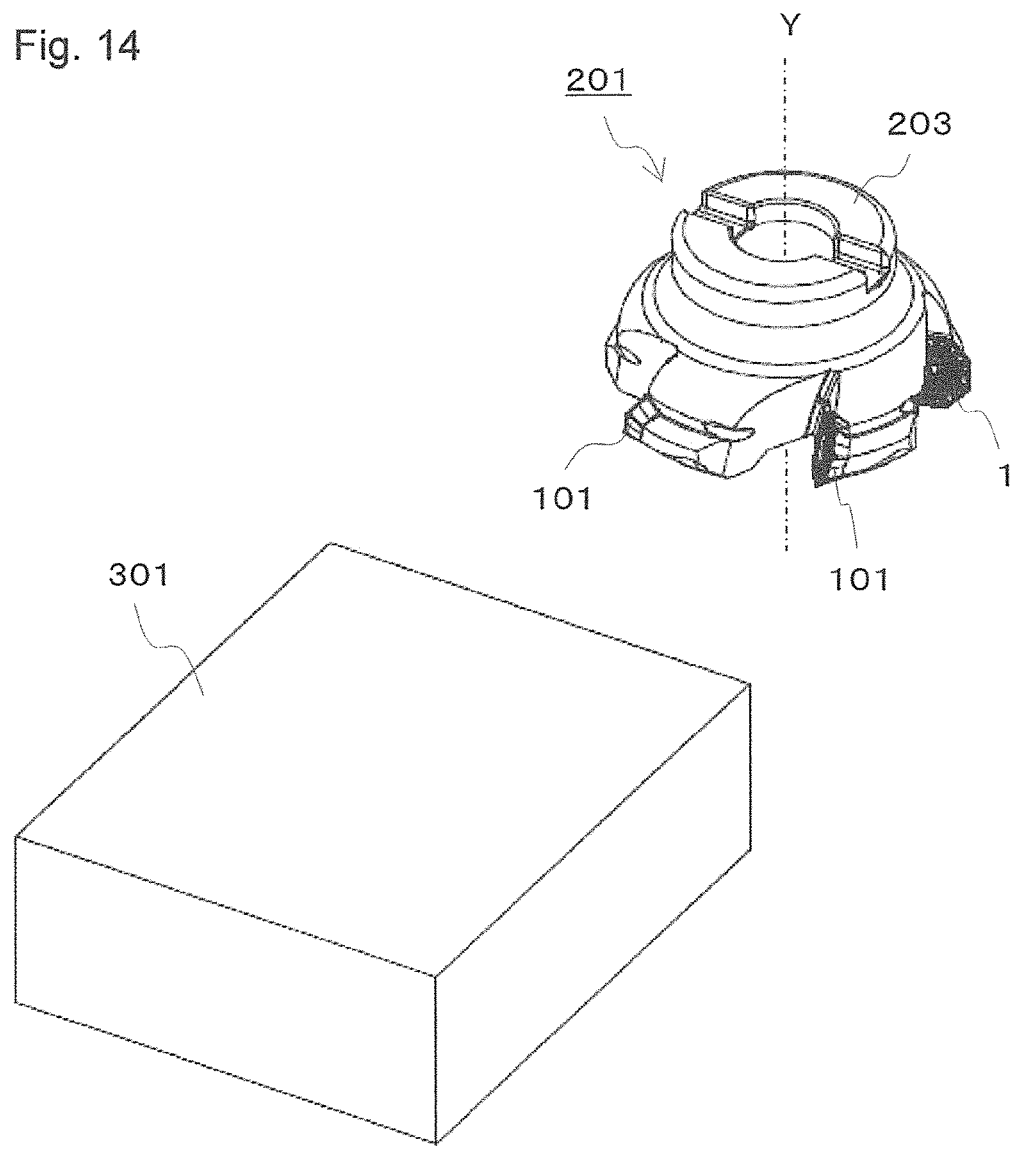
FIG. 14 is a perspective view showing a step in a method of manufacturing a machined product according to an embodiment of the present invention.
Figure 15:
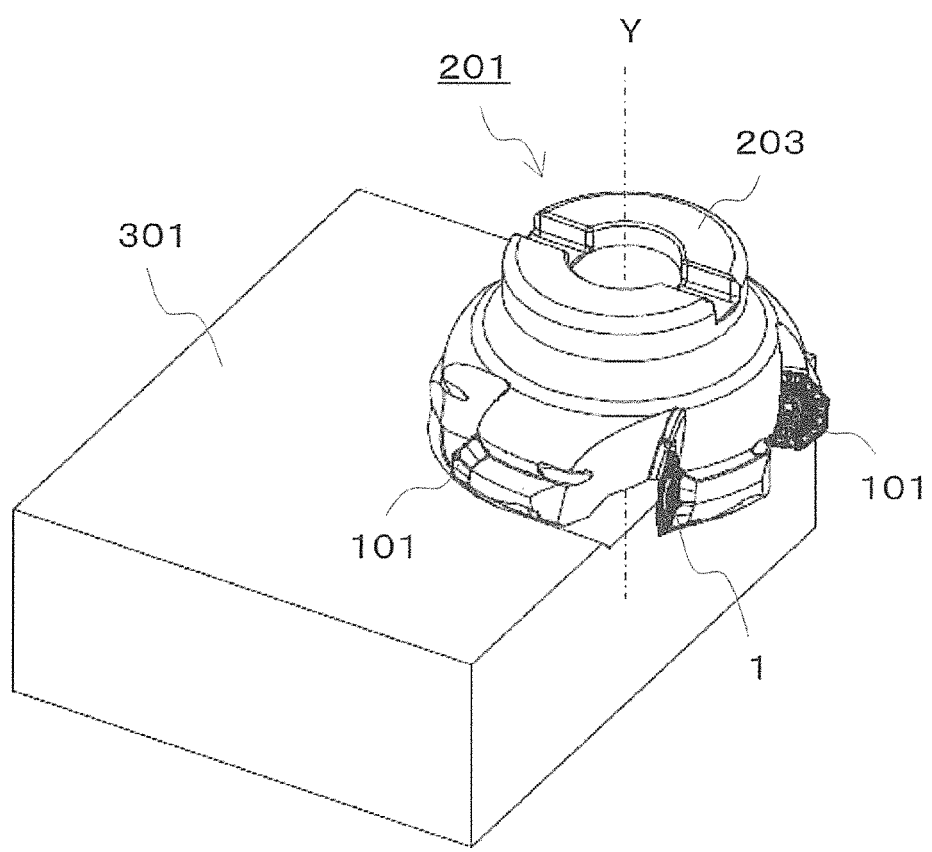
FIG. 15 is a perspective view showing a step in the method of manufacturing a machined product according to the embodiment of the present invention.
Figure 16:
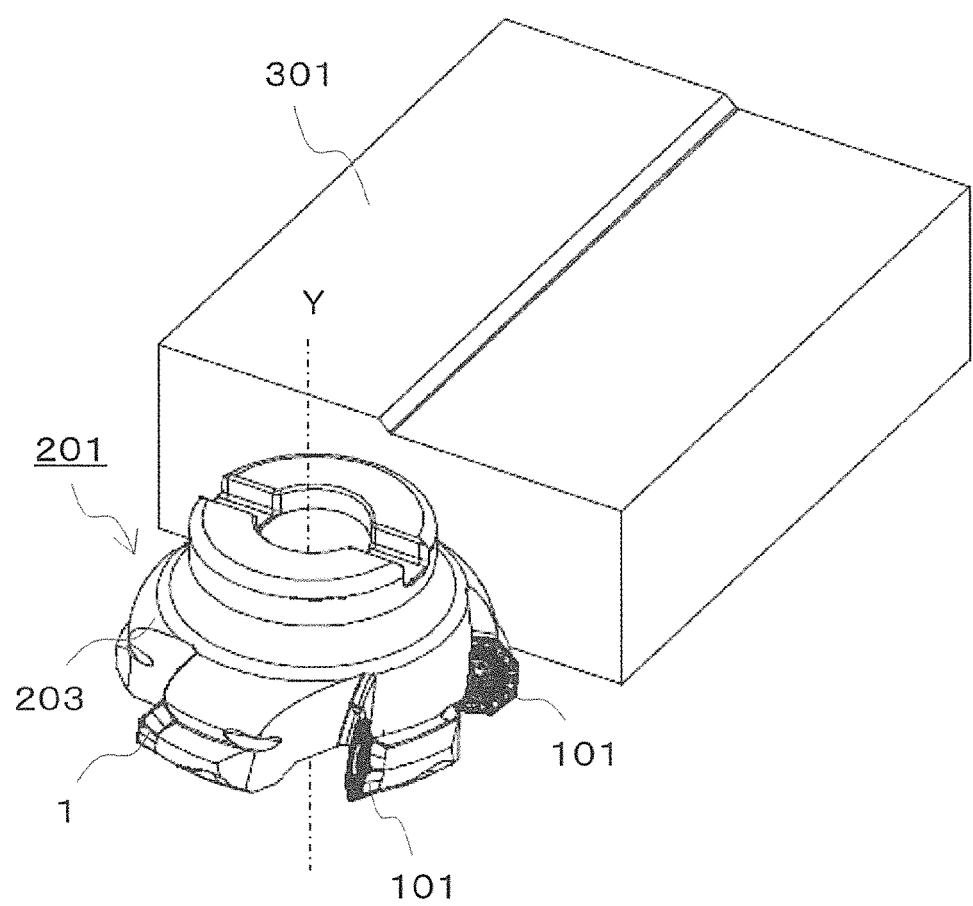
FIG. 16 is a perspective view showing a step in the method of manufacturing a machined product according to the embodiment of the present invention.

More specifically, firstly, the cutting tool 201 is relatively brought near the workpiece 301 while rotating the cutting tool 201 as shown in FIG. 14. Subsequently, the workpiece 301 is cut by bringing the cutting edge 9 in the first insert 1 and the cutting edge in the second insert 101 into contact with the workpiece 301 as shown in FIG. 15. Thereafter, the cutting tool 201 is relatively separated from the workpiece 301 as shown in FIG. 16.

In the present embodiment, the workpiece 301 is fixed and the cutting tool 201 is brought near. In FIGS. 14 and 15, the workpiece 301 is fixed and the cutting tool 201 is kept rotated. In FIG. 16, the workpiece 301 is fixed and the cutting tool 201 is kept away. During the cutting process with the manufacturing method of the present embodiment, the workpiece 301 is fixed and the cutting tool 201 is kept in motion in each of the steps. It is, however, not intended to limit to this embodiment.

For example, in the step (1), the workpiece 301 may be brought near the cutting tool 201. Similarly, in the step (3), the workpiece 301 may be separated from the cutting tool 201. When the cutting process is continued, it is necessary to repeat the step of bringing the cutting edge 0 in the first insert 1 and the cutting edge in the second insert 101 into contact with different portions of the workpiece 301, while keeping the cutting tool 201 rotated.

Representative examples of the material of the workpiece 301 include carbon steel, alloy steel, stainless steel, cast iron, and nonferrous metals.

DESCRIPTION OF THE REFERENCE NUMERAL 1 cutting insert (first insert)
3 upper surface
5 lower surface
7 side surface
9 cutting edge
9a front end portion
11a first corner edge
11b second corner edge
13 wiper edge
15 first wiper edge
17 second wiper edge
19 through hole
21 third wiper edge
23 first straight line edge
25 second straight line edge
101 cutting insert (second insert)
201 cutting tool
203 tool body (holder)
205 insert pocket
207 screw
301 workpiece

The invention claimed is:

1. A cutting insert, comprising:
a polygonal shaped upper surface comprising a first corner and a second corner adjacent to the first corner;
a lower surface;
a side surface connected to each of the upper surface and the lower surface; and
a cutting edge located along an intersection of the upper surface and the side surface,
wherein the cutting edge comprises an arc-shaped first corner edge located at the first corner, an arc-shaped second corner edge which are respectively located at the second corner, and a wiper edge located between the first corner edge and the second corner edge,
wherein the wiper edge comprises an arc-shaped first wiper edge and an arc-shaped second wiper edge located closer to the second corner edge than the first wiper edge,
wherein $R0<R1<R2$ is satisfied wherein R1 is a radius of curvature of the first wiper edge, R2 is a radius of curvature of the second wiper edge, and R0 is a radius of curvature of each of the first corner edge and the second corner edge in a top view, and
wherein the wiper edge further comprises an arc-shaped third wiper edge located between the first wiper edge and the second wiper edge, and $R1<R3$ is satisfied wherein R3 is a radius of curvature of the third wiper edge in a top view.

2. The cutting insert according to claim 1, wherein the third wiper edge is located so as to include a portion most away from a virtual straight line connecting a center of the first corner edge and a center of the second corner edge when the wiper edge is viewed from above.

3. The cutting insert according to claim 1, wherein the third wiper edge is shorter than each of the first wiper edge and the second wiper edge.

4. The cutting insert according to claim 1, wherein the second wiper edge is longer than the first wiper edge.

5. The cutting insert according to claim 1, wherein the cutting edge further comprises a first straight edge having a straight line shape and connecting the first corner edge and the first wiper edge.

6. The cutting insert according to claim 1, wherein the cutting edge further comprises a second straight edge having a straight line shape and connecting the second corner edge and the second wiper edge.

7. A cutting tool, comprising:
  a tool body comprising an insert pocket on a front end side; and
  a cutting insert according to claim 1, the cutting insert being attached to the insert pocket so that the cutting edge protrudes beyond the tool body.

8. The cutting tool according to claim 7, wherein the cutting insert is attached to the insert pocket so that the wiper edge in the cutting edge protrudes most in a front end direction beyond the tool body.

9. The cutting tool according to claim 7, wherein at least a part of the first wiper edge is located closer to an outer peripheral side of the tool body than a portion of the cutting edge which protrudes most in the front end direction beyond the tool body.

10. A method of manufacturing a machined product, comprising:
  rotating a cutting tool according to claim 7;
  bringing the cutting edge in the cutting tool being rotated into contact with a workpiece; and
  separating the cutting tool from the workpiece.

* * * * *